United States Patent [19]
Takada et al.

[11] Patent Number: 5,690,343
[45] Date of Patent: Nov. 25, 1997

[54] METAL GASKET

[75] Inventors: Kazukuni Takada, Ibaragi; Hiroshi Uemura, Higashiosaka; Masahiko Miura, Kawachinagano; Yoshikazu Shinpo, Nisshin; Kazuaki Sugimura; Kazuya Nakata, both of Toyota, all of Japan

[73] Assignees: Nippon Gasket Co., Ltd., Osaka-fu; Toyota Jidosha Kabushiki Kaisha, Aichi-ken, both of Japan

[21] Appl. No.: 707,583

[22] Filed: Sep. 5, 1996

[30] Foreign Application Priority Data

Sep. 5, 1995 [JP] Japan ...................... 7-250139

[51] Int. Cl.$^6$ ...................................... F16J 15/00
[52] U.S. Cl. .................. 277/235 B; 277/180; 277/236
[58] Field of Search ................... 277/180, 235 B, 277/236, 207 R, 211, 213, 233

[56] References Cited

U.S. PATENT DOCUMENTS

| | | | |
|---|---|---|---|
| 4,196,913 | 4/1980 | Oka | 277/235 B |
| 4,867,462 | 9/1989 | Udagawa | 277/236 |
| 5,286,039 | 2/1994 | Kawaguchi et al. | 277/180 |
| 5,294,135 | 3/1994 | Kubouchi et al. | 277/236 |
| 5,549,307 | 8/1996 | Capretta et al. | 277/235 B |
| 5,586,776 | 12/1996 | Kubouchi et al. | 277/235 B |

FOREIGN PATENT DOCUMENTS

| | | |
|---|---|---|
| 054495181 | 12/1991 | European Pat. Off. . |
| 62-155374 | 7/1987 | Japan . |
| 62-181756 | 11/1987 | Japan . |
| 63-59262 | 4/1988 | Japan . |
| 63-62668 | 4/1988 | Japan . |
| 63-74561 | 5/1988 | Japan . |
| 63-74562 | 5/1988 | Japan . |
| 63-293363 | 11/1988 | Japan . |
| 643059 | 1/1989 | Japan . |
| 64-65367 | 3/1989 | Japan . |
| 466457 | 6/1992 | Japan . |
| 51731 | 1/1993 | Japan . |
| 55331 | 2/1993 | Japan . |
| 8100859 | 4/1996 | Japan . |

OTHER PUBLICATIONS

Japanese Patent Abstract No. 1-104953 filed 21 Apr. 1989.
Japanese Patent Abstract No. 1-35057 filed 2 Jun. 1989.
Japanese Patent Abstract No. 63-246571 filed 13 Oct. 1988.
Japanese Patent Abstract No. 63-246572 filed 13 Oct. 1988.
Japanese Patent Abstract No. 1-73157 filed 17 Mar. 1989.

*Primary Examiner*—Daniel G. DePumpo
*Attorney, Agent, or Firm*—Browdy and Neimark

[57] ABSTRACT

In this metal gasket, the beads formed on an intermediate plate prevent a full compression of bead plates and improve the sealability of the gasket. This metal gasket comprises first and second bead plates having main beads extending along the circumferences of holes, and an intermediate plate interposed between the first and second bead plates. The intermediate plate is provided in the regions thereof which are between the holes and the main bead-contacting portions thereof with beads opposed to the first bead plate, and these beads form compensating portions for the first bead plate. The second bead plate is provided with auxiliary beads having projecting portions engageable with the recessed portions of the beads on the intermediate plate. The compensating portions mentioned above prevent a full compression of the beads on the bead plates when the metal gasket is tightened, and offset the irregularity of the opposed surfaces of a cylinder head and a cylinder block. The auxiliary beads improve the sealability of the second bead plate with respect to the compensating portion-carrying intermediate plate.

18 Claims, 8 Drawing Sheets

5,690,343

METAL GASKET

BACKGROUND OF THE INVENTION

1. Field of the Invention

This invention relates to a metal gasket used to seal a clearance between opposed fixing surfaces in a multicylinder engine, and comprising a pair of bead plates on which beads are formed along the circumferences of holes, and an intermediate plate interposed between the bead plates.

2. Description of the Prior Art

The conventional structural members of an engine, such as an aluminum cylinder head and an aluminum cylinder block have small weight and a low rigidity, so that relative displacement therebetween tends to increase during an operation of the engine. Accordingly, a metal gasket for sealing a clearance between the opposed surfaces of these structural members are made of elastic metal plates having beads on the portions thereof which are close to the circumferences of through holes therein corresponding to cylinder bores and water and oil passages.

The conventional metal gaskets include a metal gasket formed by a pair of bead plates comprising elastic metal plates on which beads are formed, and an intermediate plate interposed between the bead plates. When the metal gasket is held between the opposed surfaces of a cylinder head and a cylinder block and tightened so as to put the metal gasket in a fully buckled state, the bead plates and intermediate plate are pressed strongly against each other at the beads and the regions in the vicinity thereof between the opposed surfaces due to the reaction occurring when the beads on the two bead plates are crushed and deformed. Thus, the sealing function of the metal gasket for preventing a fluid flowing in the through holes from leaking from the opposed surfaces of the structural members. The intermediate plate is provided with compensating portions having the function of stoppers for restricting the deformation of the two bead plates when the metal gasket is tightened, and the function of offsetting the irregularity between the mentioned opposed surfaces at this time.

This kind of metal gaskets include the metal gasket provided with grommets on its intermediate plate and disclosed in Japanese Patent Laid-Open No. 55374/1987. Japanese Patent Laid-Open No. 65367/1989 discloses a metal gasket provided with stepped portions and grommets on its intermediate plate. Japanese Patent Laid-Open No. 293363/1988 discloses a metal gasket in which spacers are interposed between laminated intermediate plates so as to form stepped portions thereon. Japanese Utility Model Laid-Open No. 66457/1992 discloses a metal gasket in which one of laminated intermediate metal plates is provided with stepped portions with the other thereof provided with stepped portions comprising folded portions.

In these metal gaskets, the stepped portions of the intermediate plate are formed by sheet metal work, and it is technically difficult to form the stepped portions to an arbitrary height, or to completely uniform height around the circumferences of the holes, by sheet metal work. When an engine continues to be driven with a grommet-carrying metal gasket used in the condition that the metal gasket is tightened and compressed in a fully buckled state between the cylinder block and cylinder head, the grommet-forming stepped portions and folded portions receive in a residual stress-carrying state bending stress further exerted thereon repeatedly, so that cracks and permanent set in fatigue readily occur in the grommet-forming portions.

In the case of a metal gasket in which the intermediate plates comprise two or not less than two laminated metal plates, or in the case of a metal gasket in which spacers are interposed between intermediate plates, the bead plates themselves comprising two metal plates cause the above-mentioned problems to arise, clearances become liable to occur between the laminated metal plates, a fluid, such as a combustion gas which passes through the through holes of the metal gasket becoming liable to leak to the outside of the metal gasket through the clearances. Although an idea of coating the metal plates of the metal gasket with rubber or a resin to fill up the clearances between the laminated metal plates for the purpose of preventing the leakage of the fluid has been proposed, the clamping force of the bolts for fixing the cylinder head and cylinder block to each other decreases gradually as the layers of rubber or a resin are deteriorated, so that the sealing function of the metal gasket lowers.

In order to form grommets on an intermediate plate, the plate cannot be subjected to bending work, the degree of the technical difficulty of which is high, because of the necessity of preventing the occurrence of cracks in addition to the lowering of the sealing function, and the height of stepped portions and the thickness of the plate cannot be set irrespectively of each other. When the intermediate plate is used for an engine, a compression ratio and a total thickness of the gasket are restricted. Due to such technical background, the determining of the thickness of the intermediate plate is also restricted.

When the number of the metal plates laminated and that of accessory parts are increased, the designing, manufacturing and quality controlling of each part become necessary to cause the overall cost to increase.

A conventional metal gasket basically requires two intermediate plates in order to obtain at the portions thereof which are around the combustion chamber holes compensating portions having the function of restricting the deformation of the beads on the two bead plates, i.e. the full compression preventing function, and the function of offsetting the irregularity of the opposed fixing surfaces when the metal plates are tightened. The compensating portions are formed by using additional members, such as spacers, or by providing folded portions at predetermined parts of a metal plate constituting an intermediate plate. Therefore, the compensating portions have problems of stress and sealability as mentioned above, and require an increase in the manufacturing steps and quality control. Consequently, it cannot be avoided that the manufacturing cost increases.

The applicant developed a metal gasket in which the compensating portions of an intermediate plate were improved as shown in FIG. 23 (refer to Japanese Patent Laid-Open No. 100859/1996). In this metal gasket, the intermediate plate 60 interposed between bead plates 51, 52 comprises a metal plate the thickness of which is set larger than that of the bead plates 51, 52. The intermediate plate 60 is provided in the regions thereof which are closer to holes than beads 53, 54 of the bead plates 51, 52 with stepped portions 63 extending toward one bead plate 51 and having a height smaller than that of the beads 53, and in the regions thereof which are closer to the holes than the stepped portions 63 with stepped portions 64 extending toward the other bead plate 52 and having a height not less than that of the stepped portions 63 and smaller than the sum of the height of the stepped portions 63 and that of the beads 54. The annular portions between these stepped portions constitute stoppers, i.e. compensating portions 65 for the first-mentioned bead plate 51, and the annular portions closer to the holes A than the stepped portions 64 compensating portions 66 for the other bead plate 52.

In the metal gasket, the compensating portions 65, 66 the thickness of which is set arbitrarily within a permissible range are obtained without using additional members nor forming folded portions. This enables the surface pressure balance to be improved, the stress variation of the bead plates 51, 52 and the bending stress exerted on the compensating portions 65, 66 to be reduced, the breakage of the beads 53, 54 and compensating portions 65, 66 and a decrease in the sealing effect to be prevented, and a stable sealing effect to be displayed. The two types of compensating portions 65, 66 formed on the intermediate plate 60 are adapted to display a sealing effect which protects the beads 53, 54, and also prevent a full compression of the beads 53, 54 so as to protect the same. Moreover, the shape of the two types of compensating portions 65, 66 is varied along the combustion chamber holes A and combustion gas holes in each region thereof, or the compensation portions 65, 66 are formed so as to extend intermittently, whereby the compensating portions are formed in an optimum condition with respect to the positions of the holes and bolts.

The applicant has then tried to develop such a metal gasket by making efforts to improve the relative structures of the intermediate plate and bead plates while retaining the objects of the previously developed metal gasket described above, using no additional members, being manufactured without forming folded portions difficult to meet the conditions for preventing the occurrence of stress, improving the sealing performance around the through holes, reducing the stress variation of the bead plates, preventing the breakage of the beads and a decrease in the sealing effect, providing a stable sealing effect and being manufactured at a low cost.

SUMMARY OF THE INVENTION

A primary object of the present invention is to provide a metal gasket having a pair of bead plates and an intermediate plate, characterized in that the beads formed on the intermediate plate are provided with the function of stoppers (compensating portions) with respect to a first bead plate, a second bead plate being provided with auxiliary beads corresponding to the beads on the intermediate plate, this arrangement enabling the stress variation of the bead plates to be reduced, the breakage of the main beads to be prevented, a stable effect of preventing the leakage of a fluid, such as a gas from clearances between the portions of the laminated metal plates, i.e. the intermediate plate and bead plates which are around the through holes to be obtained, and the manufacturing cost to be reduced.

The present invention relates to a metal gasket having first and second bead plates comprising elastic metal plates on which main beads are formed along the circumferences of parallel-arranged holes, and an intermediate plate interposed between the first and second bead plates the main beads of which are arranged in an opposed state, and having a thickness larger than that of the first and second bead plates, the intermediate plate being provided in the regions thereof which are on the inner side of the main beads with beads extending toward the first bead plate and having a height smaller than that of the main beads, the second bead plates being provided with auxiliary beads having projecting portions engageable with recessed portions of the beads of the intermediate plate.

In this metal gasket, at least one surface, on which the beads are formed, of the intermediate plate is opposed in a free condition, in which the metal gasket has not yet been tightened, to the opposed bead plate with clearances left between the intermediate plate and first and second bead plates. When a cylinder head and a cylinder block are tightened by bolts, the first and second bead plates held between the opposed fixing surfaces of the cylinder head and cylinder block come into contact with the intermediate plate with the beads bent at the same time. During this time, the full compression of the main beads on the bead plates is prevented by the beads on the intermediate plate. The beads on the intermediate plate constitute stoppers (compensating portions) for offsetting the irregularity of the clearance between this plate and the first bead plate.

After the main beads on the first bead plate have contacted the compensating portions of the intermediate plate, the amount of displacement thereof is restricted, so that the full compression of the main beads is prevented, and with the elastic force of the main beads remaining, the function of offsetting the irregularity of the opposed surfaces of the cylinder head and cylinder body is displayed. Since the height of the beads on the intermediate plate with respect to the main surface portion of the intermediate plate is smaller than that of the main beads on the first bead plate, the rigidity of the beads constituting the compensating portions is high, so that, even if the beads on the intermediate plate are deformed by the gasket tightening force mentioned above, the compensating function thereof is not lost.

Since the projecting portions of the auxiliary beads formed on the second bead plate are engageable with the recessed portions of the beads on the intermediate plate, the clearance between the intermediate plate and second bead plate is offset satisfactorily when the metal gasket is in a fully buckled state, and the sealing performance of the gasket is improved. The heights of the main beads and auxiliary beads formed on the second bead plate can be set to comparatively low equal level. In such a case, the engagement of the projecting portions and recessed portions of the beads on the second bead plate and intermediate plate respectively with each other is carried out smoothly when the metal gasket is compressed.

The intermediate plate is further provided in the positions thereon which are radially different from those of the main beads on the second bead plate, and which are in the regions thereof on the inner side of the same main beads, with second beads extending toward the second bead plate and having a height smaller than that of the main beads. The first bead plate is provided with auxiliary beads the projecting portions of which are engageable with the recessed portions of the second beads on the intermediate plate when the metal gasket is tightened and fully buckled.

According to this metal gasket, the beads on the intermediate plate constitute first compensating portions for preventing the full compression of the first bead plate, and another type of beads on the intermediate plate work as second compensating portions for preventing the full compression of the second bead plate. The second bead plate is provided in some cases with auxiliary beads in the regions as well which are on the outer sides of the main beads. When a distance between adjacent holes is long in such a case, adjacent main and auxiliary beads do not meet, and, when a distance between adjacent holes is short, the stoppers comprising the auxiliary beads meet the adjacent main beads in the regions between the holes to form common stoppers.

Therefore, after the bead plates have been brought into contact with the compensating portions, which comprise corresponding beads, on both surfaces of the intermediate plate, the amount of displacement of the bead plates is restricted, so that the main beads are not deformed to such an extent that the main beads are completely compressed or crushed. Namely, the elastic force of the main beads remains and the main beads have the function of offsetting the irregularity of the opposed surfaces of the cylinder head and cylinder block.

Since the heights of the beads constituting the first and second compensating portions with respect to the main surface of the intermediate plate are smaller than that of the main beads, the rigidity of the beads constituting the two types of compensating portions is high, so that, even if the two types of compensating portions are deformed during the gasket tightening operation, the function of these compensating portions is not lost. Since the projecting portions of the auxiliary beads on the second bead plate engage the recessed portions of the beads on the intermediate plate when the metal gasket is tightened, the compensating function of the intermediate plate with respect to the bead plate and the sealing function of the intermediate plate based on the engagement of the recessed and projecting portions of the beads and auxiliary beads on the intermediate plate and bead plates respectively can be secured on both surfaces of the intermediate plate.

When beads extending toward the bead plates and having a height smaller than that of the main beads on the bead plates are formed on the positions on the intermediate plate which are radially different from those of the mentioned main beads, and which are in the regions thereof on the inner side of the same main beads, the height of the two types of beads on the intermediate plate can be set equal. In such a case, the height of the first compensating portions for the first bead plate with respect to one flat surface of the intermediate plate becomes equal to that of the second compensating portions for the second bead plate with respect to the other flat surface of the intermediate plate. Accordingly, it is expected that both the actions of the compensating portions with respect to the bead plates and the sealing function thereof based on the engagement of the recessed and projecting portions of the beads become identical. In this case, the stress occurring in the two bead plates due to the compression of the metal gasket is balanced well, and not imparted partially to either one of the bead plates.

Although the occurrence of bending stress in the bead portions provided for forming the compensating portions, at the time of a metal gasket tightening operation, cannot be avoided, the beads restrain the deformation of the intermediate plate. Therefore, the amount of deformation of the compensating portions of the intermediate plate becomes sufficiently small as compared with an amount of deformation at which the main beads on the first bead plate are crushed, and the function of the intermediate plate and compensating portions can be maintained.

In this metal gasket, the thickness $t_1$ of the intermediate plate is set basically not less than two times as large as that $t_2$ of each bead plate ($t_1/t_2 \geq 2$), and usually around 2–4 times as large as that thereof ($t_1/t_2 \geq 2$–4), and stoppers of a height smaller than that of the beads are formed on the intermediate plate. Accordingly, owing to the attainment of the prevention of the overcompression of the main beads, the permanent set in fatigue of and the occurrence of cracks in the main beads can be prevented. Owing to the stoppers, the entry of a combustion gas into the clearance around the main beads is prevented, and the main beads are protected from corrosion, whereby the lowering of the function of the main beads is prevented.

The stoppers are formed so that they are higher in the regions between the holes, and lower in the regions other than the regions between the holes, or they are formed so that they are higher in the regions between the holes and the regions oh straight lines which are perpendicular to the center line passing the centers of the holes and pass the same centers and lower in the regions other than these regions. The height of the stoppers varies in boundary regions between the large-height regions and small-height regions so as to form smoothly curved surface portions. The stoppers are formed so as to extend intermittently along the circumferences of the holes. The intermediate plate is formed out of a metal softer than that of the first and second bead plates.

This metal gasket can be formed by a pair of bead plates and one intermediate plate only, so that the number of parts and manufacturing steps can be reduced. Since a beading step for forming these plates to simple shapes is employed, it becomes possible not only to reduce the manufacturing cost greatly but also to improve the part manufacturing precision, reduce an accumulated error, control the height of the stoppers easily, improve the sealing performance owing to the reduction of the number of clearances between the metal plates and provide a highly reliable product.

The stoppers on the intermediate plate can be provided on the cylinder head side surface or cylinder block side surface or both of these surfaces with respect to the actually installed state of the metal gasket of the intermediate plate.

The stoppers can be formed to a uniform height on the intermediate plate. However, in a certain case, the height of the stoppers can be set differently depending upon the regions around the holes, or so as to deal with the deformation of the engine, for example, the deformation of the fixing surfaces of the cylinder head and cylinder block or those of the cylinder head and exhaust manifold, or the deformation thereof due to the heat and explosion occurring during an operation of the engine.

The stoppers can be provided continuously along the circumferences of the holes, or partially or intermittently along the circumferences thereof. The stoppers can be formed in an annularly projecting state, or in an arcuately projecting state or in a circularly projecting state.

In this metal gasket, additional members, such as spacers are not used to form the stoppers on the intermediate plate, i.e., neither the manufacturing of additional members nor the assembling and fixing of additional members into and to the intermediate plate are required, so that the manufacturing cost can be reduced. Owing to the stoppers formed on the intermediate plate, the inconveniences expected to occur when the assembling and fixing of parts are imperfect do not occur.

In order to form the stoppers on the intermediate plate in this metal gasket, folded portions are not formed, and they are not provided either on the hole-side edge portions of the bead plates. Therefore, the step of forming folded portions is not required, and taking measures against the occurrence of cracks in the folded portions is not necessary. This enables the manufacturing cost to be reduced.

In this metal gasket, the height of the compensating portions, which constitute the stoppers, with respect to the surface of the intermediate plate can be set arbitrarily in accordance with the set height of the beads, so that the balance of the surface pressure of the bead plates with respect to the opposed fixing surfaces can be changed suitably. This metal gasket permits the stress variation of the bead plates and the bending stress imparted to the compensating portions to be set in accordance with the actual condition, for example, in accordance with differences in properties, if any, of the bead plates. As a result, the breakage of the main beads on the bead plates and the compensating portions, and a decrease in the sealing effect are prevented, and a stable sealing effect can be displayed.

When beads of the same height are formed as stoppers on the bead plates, which are opposed to both surfaces of the intermediate plate, in this metal gasket, the height of the first compensating portions for the first bead plate with respect to one flat surface of the intermediate plate becomes equal to that of the second compensating portions for the second bead plate with respect to the other surface of the intermediate plate, and it can be expected that a difference does not occur between the actions of the first and second compensating portions for the two bead plates the dynamic properties of which are identical. In this case, the condition of stress, which occurs due to a compressive force, in the two bead plates is balanced well. Consequently, the stress variation of the bead plates and the bending stress imparted to the compensating portions of the intermediate plate are borne equally thereby, and not impartially by one bead plate and one group of compensating portions only. This enables the permanent set in fatigue and breakage of the main beads on the bead plates, the breakage of the compensating portions and a decrease in the sealing effect to be prevented, and a stable sealing effect to be displayed.

DESCRIPTION OF THE PREFERRED EMBODIMENTS

Figure 1:
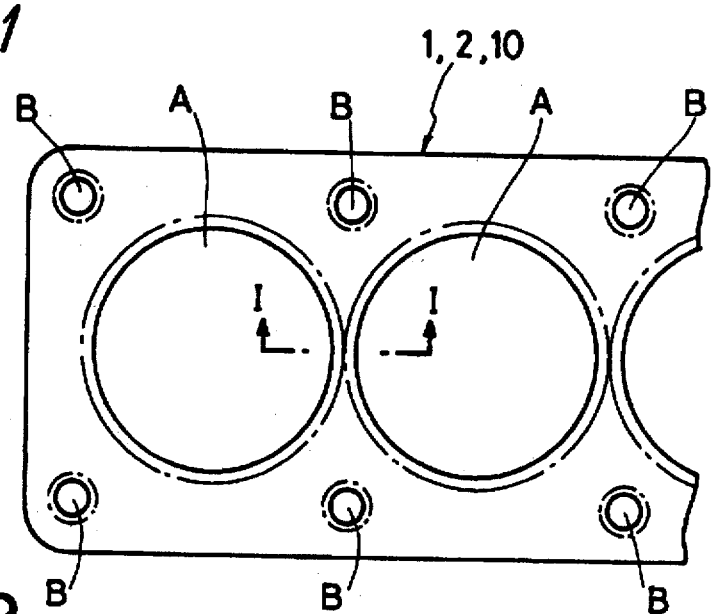
FIG. 1 is a partial plan view of the metal gasket according to the present invention.

The embodiments of the metal gasket according to the present invention will now be described with reference to the accompanying drawings. This metal gasket is adapted to seal, for example, a clearance between a cylinder bead and a cylinder block, or be held between the cylinder head and an exhaust manifold so as to seal a clearance between the opposed fixing surfaces. This metal gasket is provided with cylinder bore holes, i.e. combustion chamber holes correspondingly to cylinder bores formed in the cylinder block, or combustion gas holes correspondingly to exhaust passages in the exhaust manifold. This metal gasket is provided with a plurality of parallel-arranged holes so that the gasket can be applied to a multicylinder engine, such as a 4-cylinder engine and a 6-cylinder engine. In the drawings showing the embodiments to be described later, the parts and portions having the same construction and function are designated by the same reference numerals, and the duplication of descriptions thereof is omitted.

Figure 2:
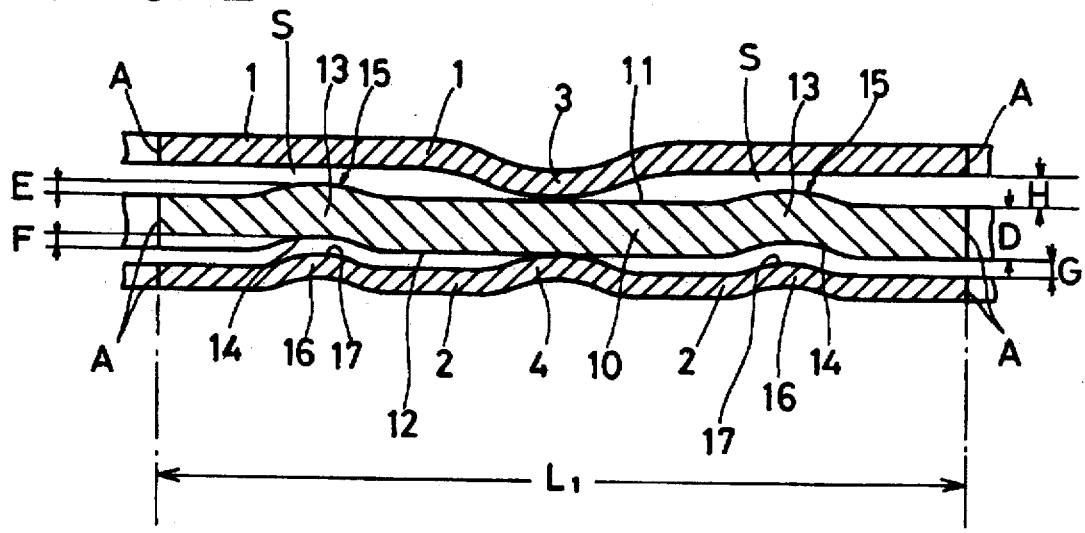
FIG. 2 is an enlarged sectional view taken along the line I—I in FIG. 1 and showing a first embodiment of the metal gasket according to the present invention.

A first embodiment of the metal gasket according to the present invention will now be described with reference to FIGS. 1 and 2. This metal gasket is provided with various kinds of holes, such as water holes and oil holes in addition to bolt holes B around combustion chamber holes (which will hereinafter be referred to as holes) A.

This metal gasket is of a laminated type in which bead plates 1, 2 comprising two elastic metal plates of the same thickness, and an intermediate plate 10 having a thickness larger than that of the bead plates 1, 2 and interposed between the same bead plates 1, 2. The bead plates 1, 2 and intermediate plate 10 are provided with the holes A in the same positions, and other various kinds of holes provided therein are basically the same. Along the circumferences of the holes A of the bead plates 1, 2, substantially concentrically and annularly surrounding cross-sectionally projecting main beads 3, 4 are formed. The main beads 3, 4 are formed so that the projecting portions thereof are opposed to and aligned with each other via the intermediate plate 10. When the plates 1, 2, 10 are laminated with the plate 10 held between the others, the beads 3, 4 are engaged with the surfaces 11, 12 respectively of the intermediate plate. The main beads 4 on the bead plate 2 are formed to a height and a width smaller than chose of the main beads 3 on the bead plate 1.

The intermediate plate 10 is provided in the regions thereof which are closer to the holes A than the portions of the surfaces 11, 12 thereof which contact the main beads 3, 4 with stoppers comprising beads 13 extending toward the bead plate 1 and having a height E smaller than that H of the beads 3 and smaller than the thickness D of the intermediate plate 10, in such a manner that the stoppers extend annularly and surround the holes A. Since the beads 13 are formed on the intermediate plate 10 by sheet metal work, recessed portions 14 having a depth F equal to the height E are formed in the opposite surface 12 thereof. Consequently, the beads 13 on the intermediate plate 10 constitute stoppers, i.e.

compensating portions 15 for the bead plate 1. When the metal gasket is in a free state in which the gasket is not yet tightened, a clearance S is formed between the compensating portions 15 and bead plate 1.

Figure 3:
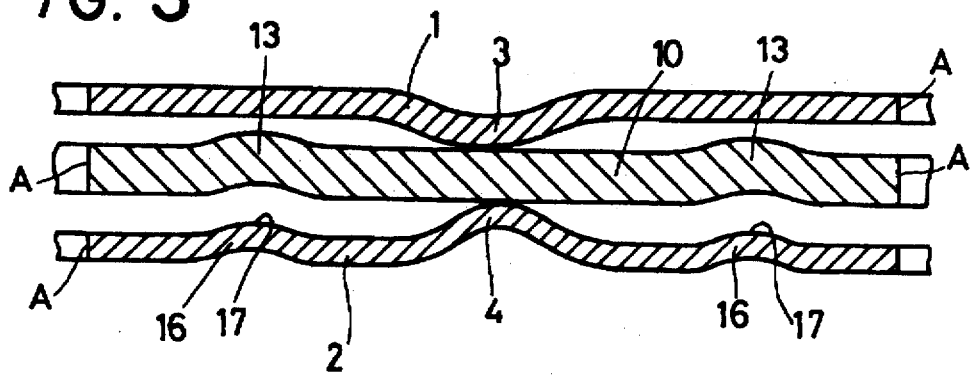
FIG. 3 is a sectional view of the first embodiment of the metal gasket according to the present invention in which the shape of a lower bead plate in FIG. 2 is partially changed.

The height and width of auxiliary beads 16 on the bead plate 2 are equal to those of the beads 13 on the intermediate plate 10. The auxiliary beads 16 on the bead plate 2 are formed so that, when the bead plates 1, 2 and intermediate plate 10 are tightened and fixed, the projecting portions 17 of the auxiliary beads 16 on the bead plate 2 just engage the recessed portions 14 of the intermediate plate 10. The height and width of the main beads 4 on the bead plate 2 may be equal to those of the auxiliary beads 16 but they are not necessarily limited to such levels. For example, in order to fulfil more reliably the sealing function of the main beads and the function of the same of offsetting the irregularity of the opposed surfaces, the main beads 4 on the bead plate 2 may be formed to a large size substantially as the main beads 3 on the bead plate 1 as shown in FIG. 3. In this case, the portions including the auxiliary beads 16 are positioned slightly away from the intermediate plate 10 when they are in a free state but the fixing of the metal gasket between the opposed surfaces by tightening the same by clamping means can be done without any troubles.

When the metal gasket is set between the opposed surfaces of the cylinder head and cylinder block and tightened by clamping means, the beads 3, 4 on the bead plates 1, 2 are elastically deformed to gradually approach the intermediate plate 10 and engage the same. During this time, the compensating portions 15 of the intermediate plate 10 restrict the post-engagement amount of deformation of the bead plate 1 so as to prevent the complete compression, i.e. full compression of the beads 3, whereby the function of the beads is retained. The height of the beads 13 constituting the compensating portions is smaller than that of the main beads 3 with respect to the surface of the intermediate plate 10, and the rigidity of the compensating portions 15 is high. Therefore, even when the compensating portions 15 are deformed due to the gasket tightening operation, the function thereof is not lost. Since the full compression of the beads 3 can be prevented, the excellent sealability thereof can be secured, and the stress amplitude of the bead plate 1 becomes small, so that large bending stress and stress amplitude do not occur in the compensating portions 15. Consequently, cracks and permanent set in fatigue do not occur in the bead plate 1. The compensating portions 15 also have the function of offsetting the irregularity occurring on the opposed surface of the cylinder bead when the gasket is tightened.

When the metal gasket is tightened between the opposed surfaces by clamping bolts, the main beads 4 on the bead plate 2 receive the tightening force and are compressed to a fully buckled state, though the degree of compression depends upon the set height of the beads 4, i.e., the main function of the beads for the bead plate 2 is displayed. Simultaneously with the compression of the main beads 4, the auxiliary beads 16 on the bead plate 2 fit in the recessed portions 14 of the intermediate plate 10. Since the projecting portions 17 of the auxiliary beads 16 do not leave a clearance between the recessed portions 14, which are on the lower side of the beads 13 of the intermediate plate 10, and the bead plate 2, the leakage of a high-temperature combustion gas, which flows from the holes A, to the outside through the clearance between the bead plate 2 and intermediate plate 10 can substantially be prevented.

Figure 4:
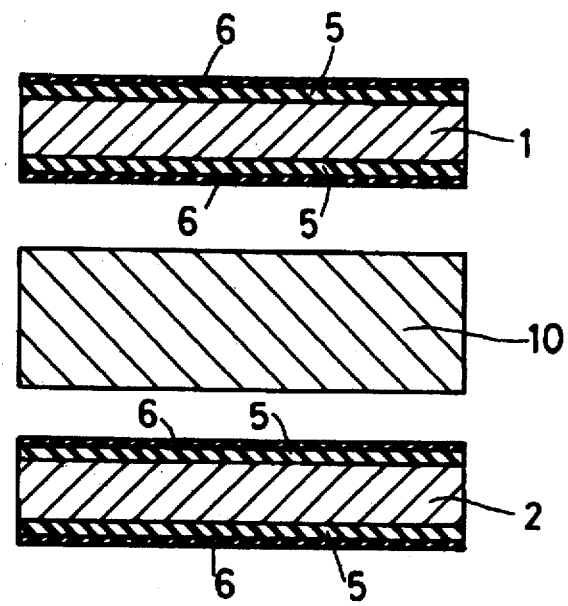
FIG. 4 is an exploded view illustrating bead plates and an intermediate plate.

The intermediate plate 10 is formed out of a metal softer than that of the bead plates 1, 2. For example, the bead plates are formed out of SUS301, and the intermediate plate 10 working as a regulating plate SECC (soft steel plate). As shown in FIG. 4, the surfaces of elastic metal plate forming the bead plates 1, 2 are coated with a heat- and oil-resisting nonmetallic material to a thickness of, for example, around 10–50 μm so as to avoid a metal-to-metal contacting condition with respect to the cylinder herd and cylinder block, and secure the corrosion resistance, durability and strength of the metal gasket. For example, the upper and lower surfaces of the bead plates 1, 2 are coated with fluororubber 5 having a heat- and oil-resistance, and the surfaces of the layers of fluororubber 5 an acrylic silicone resin 6. Even when the bead plates 1, 2, have minute recesses and projections during a machining process therefor, the nonmetallic material applied to the surfaces thereof covers these recesses and projections, so that the metal gasket fulfils its sealing function satisfactorily.

Figure 5:
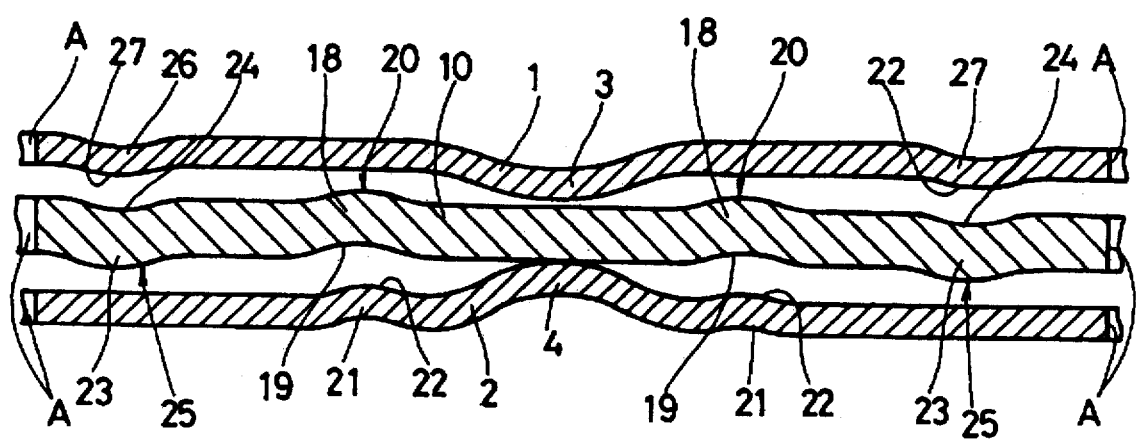
FIG. 5 is a sectional view showing a second embodiment of the metal gasket according to the present invention.

A second embodiment of the metal gasket according to the present invention will now be described with reference to FIG. 5.

The second embodiment has the same construction and function as the first embodiment except that an intermediate plate 10 is provided with beads 23 projecting toward a bead plate 2 in addition to beads 18 projecting toward a bead plate 1, with the bead plate 1 also provided correspondingly with auxiliary beads 26 having projecting portions 27 engageable with recessed portions 24 of the beads 23. Namely, the intermediate plate 10 is provided with the beads 18, which project toward the bead plate 1, at the portions thereof which are between holes A and the portions thereof with which main beads 3, 4 are engageable, and the auxiliary beads 23, which project toward the bead plate 2, at the portions thereof which are closer to the holes A than the beads 18, in such a manner that the beads 18, 23 extend annularly. As a result, the annular beads 18 on the intermediate plate 10 form stoppers, i.e. compensating portions 20 for the bead plate 1, while the annular beads 25 form stoppers, i.e. compensating portions 25 for the bead plate 2.

In accordance with the construction of the intermediate plate 10, the bead plate 2 is provided with auxiliary beads 21 having projecting portions 22 engageable with recessed portions 19 of the beads 18. The bead plate 1 is provided with auxiliary beads 26 having projecting portions 27 engageable with the recessed portions 24 of the beads 33 on the intermediate plate 10. When the metal gasket is set between the opposed surfaces and tightened by clamping means, the projecting portions 22, 27 of the auxiliary beads 21, 26 on the bead plates 1, 2 fit in a laminated state in the recessed portions 19, 24 of the beads 18, 23 on the intermediate plate 10. Therefore, the possibility that clearances are left between the intermediate plate 10 and the bead plates 1, 2 becomes small, and the prevention of the leakage of a fluid, such as a combustion gas to the outside of the gasket through the clearances between the intermediate plate 10 and the bead plates 1, 2 can be effected more reliably.

The heights and widths of the beads 23 on the intermediate plate 10 and the auxiliary beads 26 on the bead plate 1 are set suitably in accordance with a distance between the holes A. When the height and width of the auxiliary beads 21 on the bead plate 2 are set equal to those of the auxiliary beads 26 on the bead plate 1, the function of the stoppers as compensating portions for the prevention of complete compression of the main beads based on the deformation restricting effect of the bead plates, the offsetting of the irregularity of the opposed fixing surfaces and the sealing performance thereof can be balanced at both sides of the intermediate plate 10. Moreover, the stress condition is also balanced well, so that stress is not partially imparted to either one of the bead plates 1, 2. The height and width of the auxiliary beads 21, 26 are preferably set smaller than those of the main beads 3, 4. Regarding the beads 18, 23 on the intermediate plate 10, the beads 23 forming the compensating portions 25 for the bead plate 2 are provided in the positions close to the holes A, and the beads 18 forming the compensating portions 20 for the bead plate 1 in the positions far from the holes A. However, the compensating portions 20 may be provided in the positions close to the holes A, and the compensating portions 25 in the positions far from the holes A.

Figure 6:
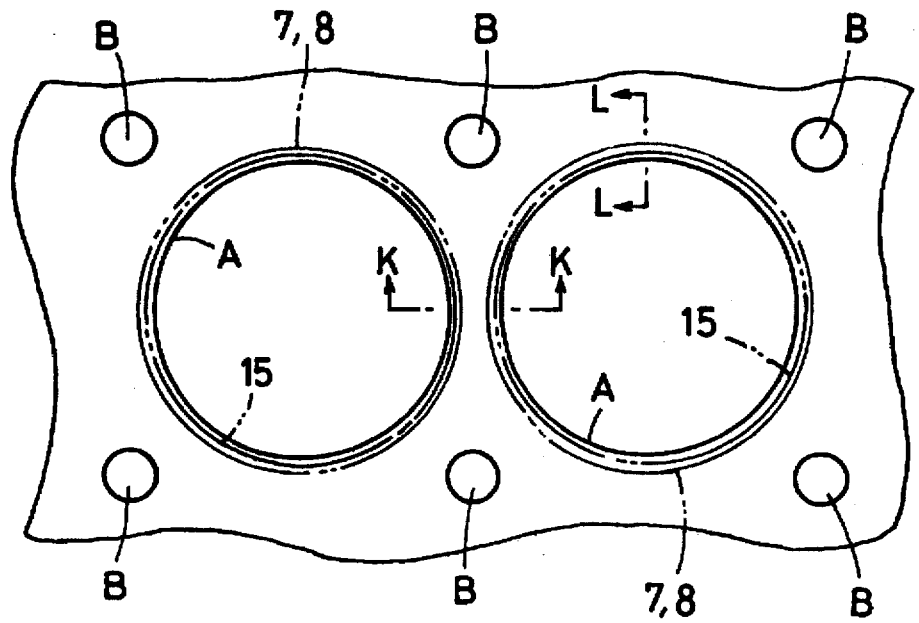
FIG. 6 is a sectional view showing a third embodiment of the metal gasket according to the present invention.
Figure 7:
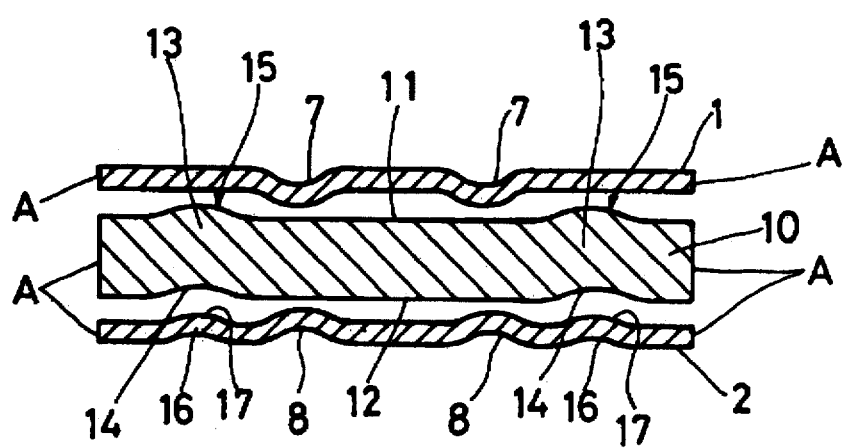
FIG. 7 is a sectional view taken along the line K—K in FIG. 6.
Figure 8:
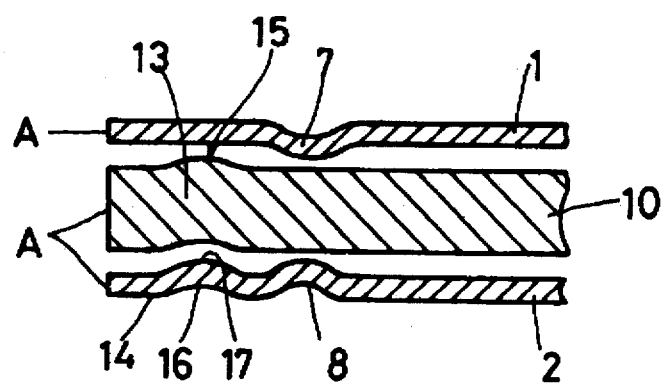
FIG. 8 is a sectional view of a portion taken along the line L—L in FIG. 6.

A third embodiment of the metal gasket according to the present invention will now be described with reference to FIGS. 6, 7 and 8.

The third embodiment has the same construction and function as the first embodiment except that the main beads formed on bead plates 1, 2 do not meet in the regions between holes A. Namely, the main beads 7 on the bead plate 1 and the main beads 8 on the bead plate 2 are formed independently and do not meet in the regions between the holes A. In the third embodiment, beads 15 (compensating portions and stoppers) formed on an intermediate plate 10 project toward the bead plate 1 disposed on the side of a cylinder head. Auxiliary beads 16 having projecting portions 17 engageable with recessed portions 14 of the beads 13 on the intermediate plate 10 are formed on the bead plate 2. In the third embodiment, the thickness of the intermediate plate 10 is set around 3–5 times as large as that of the bead plates 1, 2. FIGS. 6–8 show an example in which beads 13 atone which project toward the bead plate 1 are formed on the intermediate plate 10, in which beads projecting toward the bead plate 2 may be formed simultaneously just as in the embodiment shown in FIG. 5.

Figure 9:
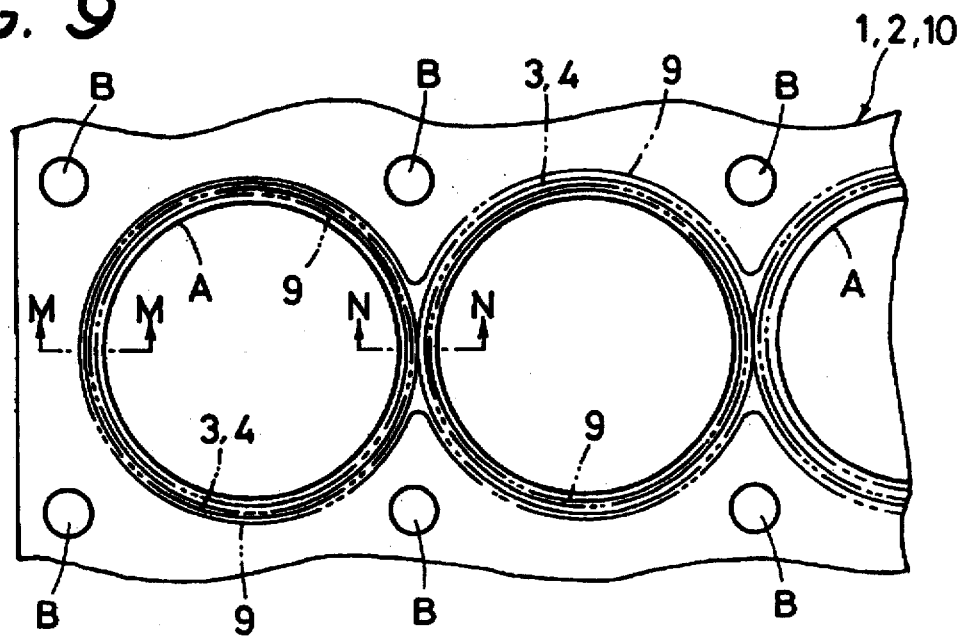
FIG. 9 is a plan view showing a fourth embodiment of the metal gasket according to the present invention.
Figure 10:
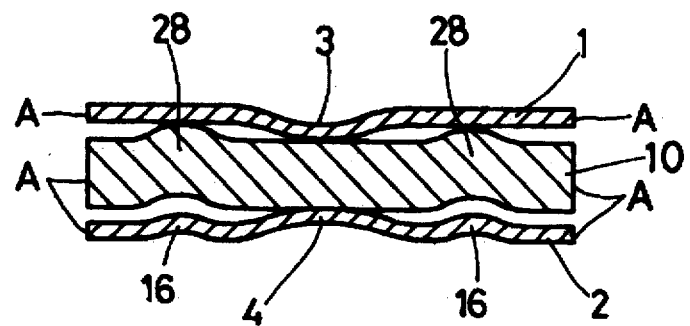
FIG. 10 is a sectional view taken along the line N—N in FIG. 9.
Figure 11:
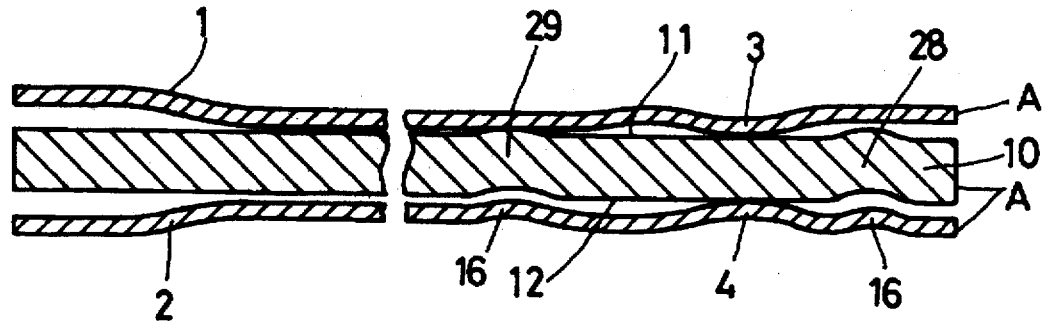
FIG. 11 is a sectional view taken along the line M—M in FIG. 9.

A fourth embodiment of the metal gasket according to the present invention will now be described with reference to FIGS. 9, 10 and 11.

The fourth embodiment is different from the first embodiment only in that beads on an intermediate plate 10 are formed on the inner and outer sides of beads on bead plates. The intermediate plate 10 is provided with beads 28 on the inner side of beads 3, and beads 29 on the outer side of the beads 3. The beads 29 formed in the regions on the outer side of the beads 3 do not enter the regions between the holes A but are continuous with adjacent beads 9.

Figure 12:
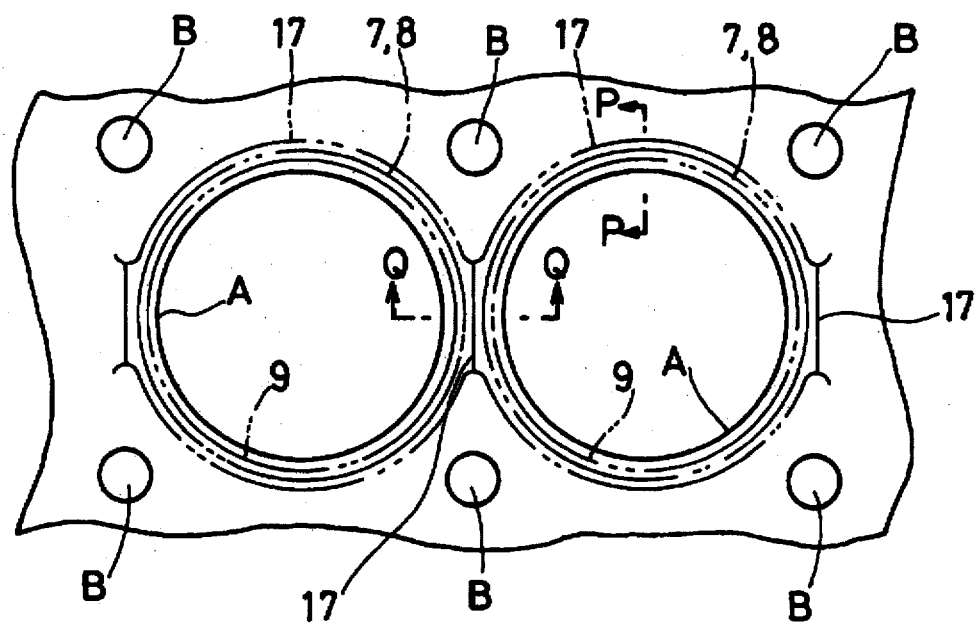
FIG. 12 is a plan view showing a fifth embodiment of the metal gasket according to the present invention.
Figure 13:
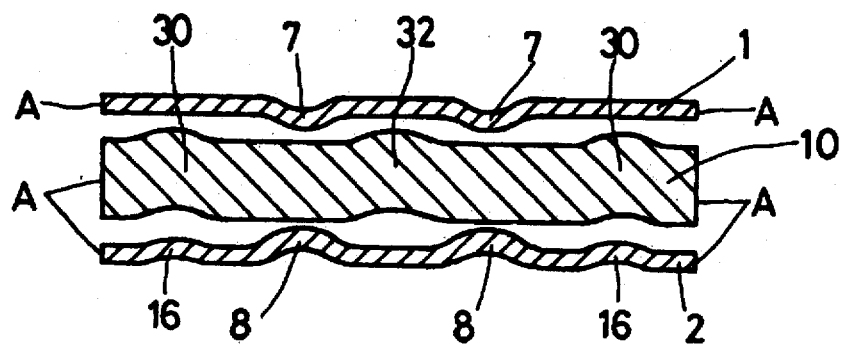
FIG. 13 is a sectional view taken along the line Q—Q in FIG. 12.
Figure 14:
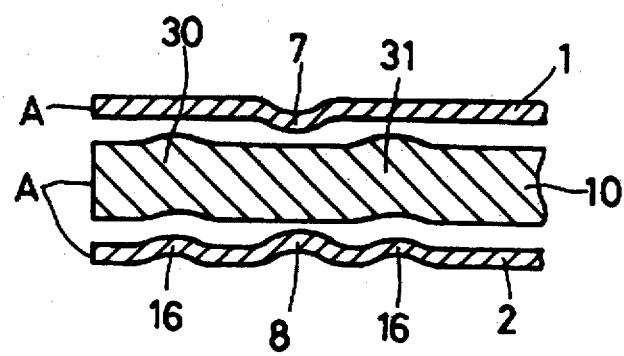
FIG. 14 is a sectional view taken along the line P—P in FIG. 12.

A fifth embodiment of the metal gasket according to the present invention will now be described with reference to FIGS. 12, 13 and 14.

The fifth embodiment is different from the third and fourth embodiments in that outer beads 31 on the intermediate plate 10 meet in the regions between holes A. Main beads 7, 8 on the bead plates 1, 2 do not meet in the regions between the holes A; they extend independently. The intermediate plate 10 is provided with beads 30 on the inner side of the main beads 7, 8, and beads 31 on the outer side thereof. The beads 31 positioned on the outer side of the main beads 7, 8 meet in the regions between the holes A and are formed into common beads 32.

Figure 15:
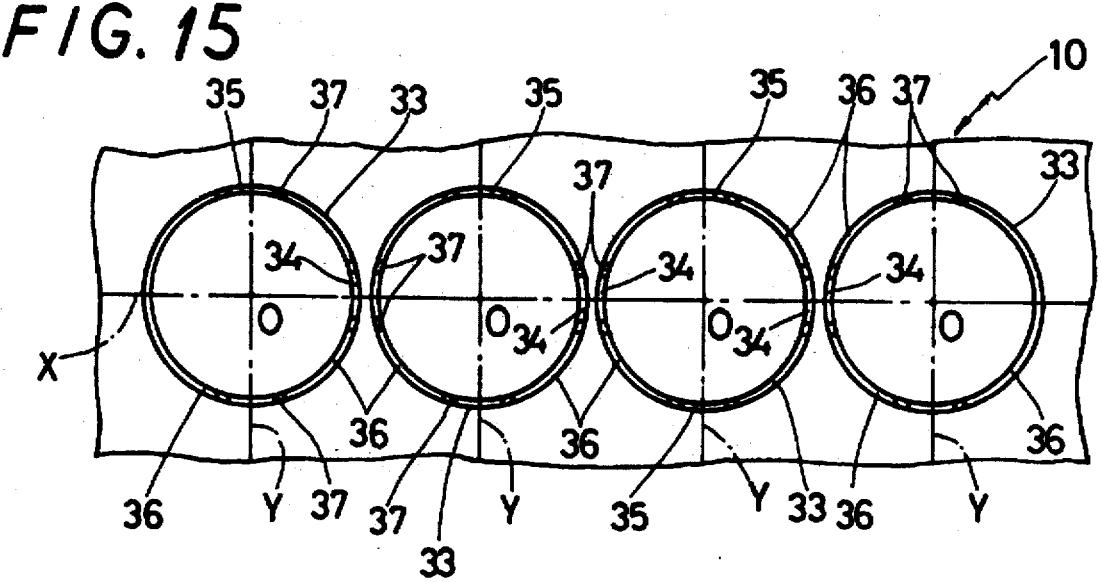
FIG. 15 is an explanatory view showing a sixth embodiment of the metal gasket according to the present invention.
Figure 16:
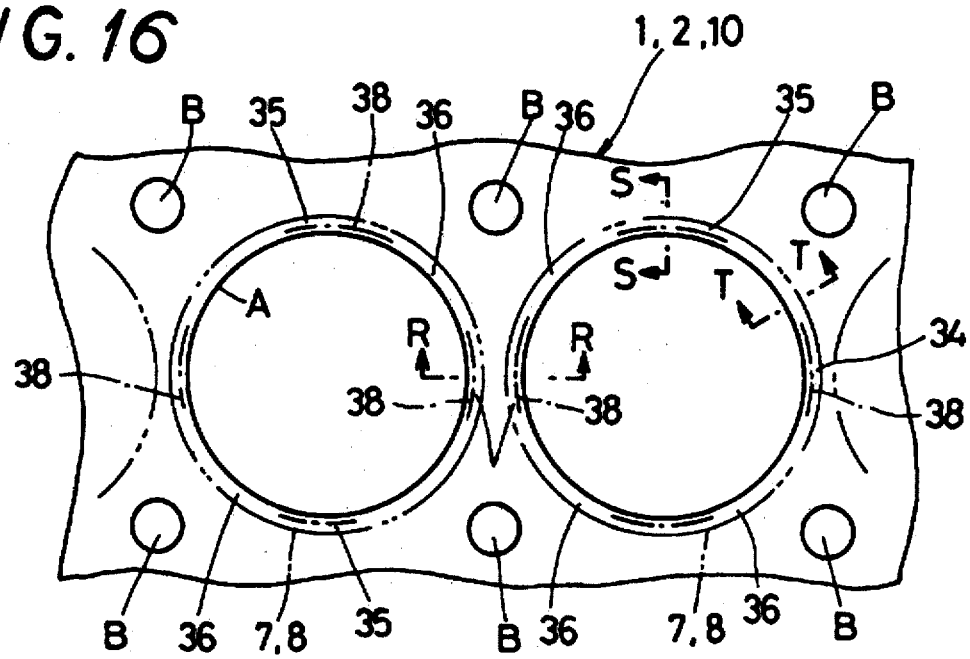
FIG. 16 is a plan view showing a seventh embodiment of the metal gasket according to the present invention.
Figure 17:
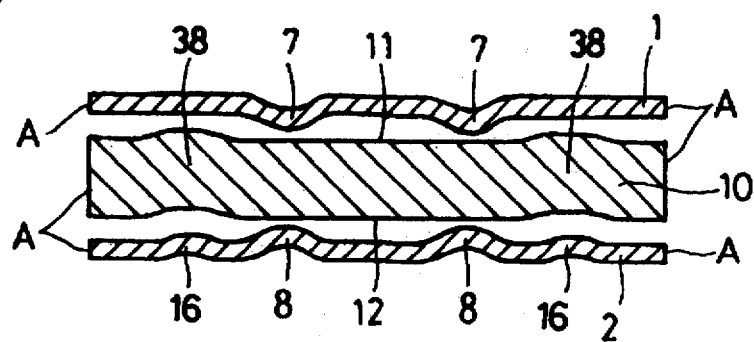
FIG. 17 is a sectional view taken along the line R—R in FIG. 16.
Figure 18:
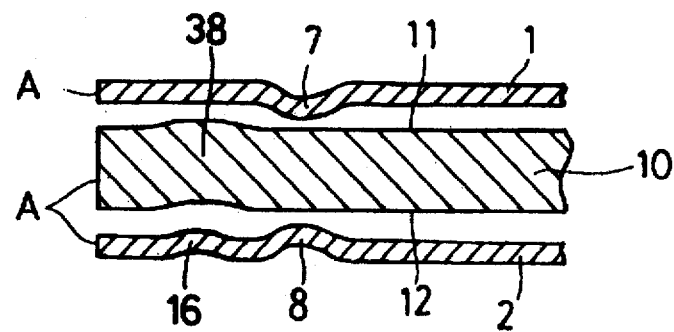
FIG. 18 is a sectional view taken along the line S—S in FIG. 16.
Figure 19:
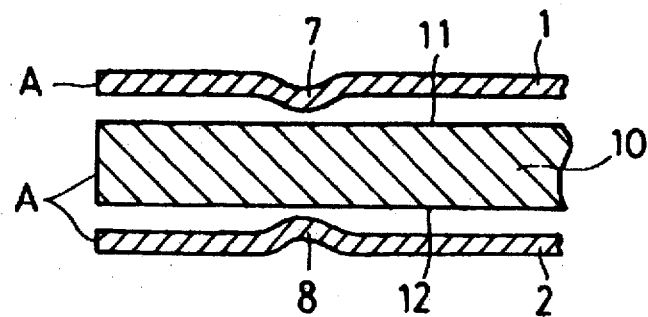
FIG. 19 is a sectional view taken along the line T—T in FIG. 16.
Figure 20:
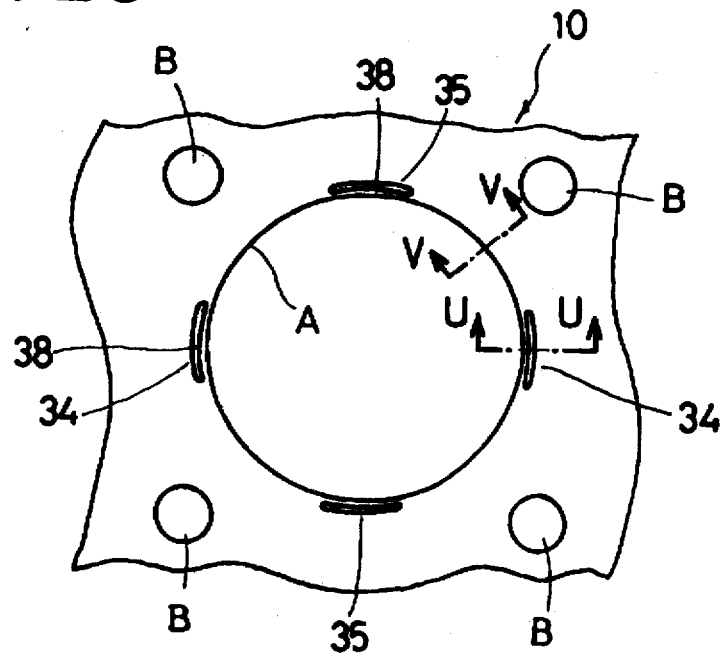
FIG. 20 is a plan view showing an intermediate plate in the metal gasket shown in FIG. 16.
Figure 21:
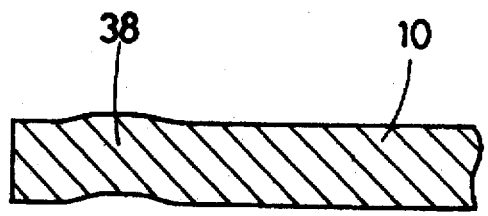
FIG. 21 is a sectional view taken along the line U—U in FIG. 20.
Figure 22:
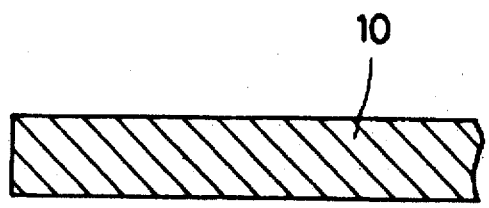
FIG. 22 is a sectional view taken along the line V—V in FIG. 20.
Figure 23:
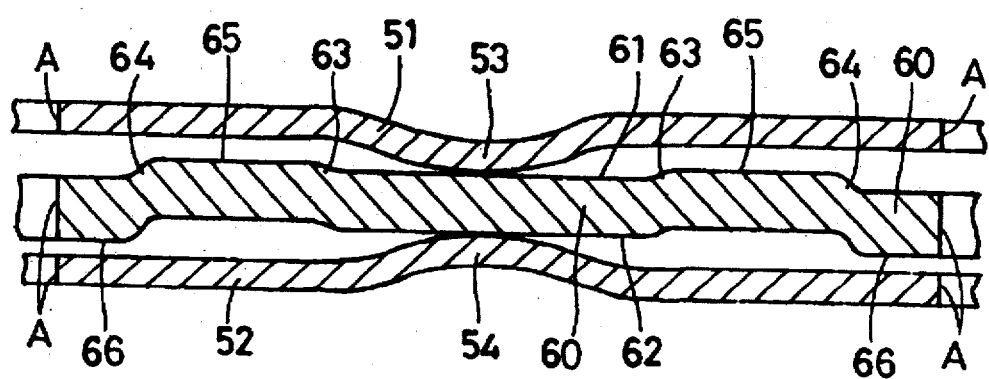
FIG. 23 is a sectional view showing a prior art metal gasket.

A sixth embodiment of the metal gasket according to the present invention will now be described with reference to FIG. 15.

Beads 33 formed on an intermediate plate 10 have a larger height in regions 34 between holes and in regions 35 on straight lines Y which are perpendicular to a center line X passing the centers O of the holes, and which pass the same centers O, and a smaller height in the other regions 36. The height of the beads 33 varies in boundary regions 37 between the large height regions 35 and small height regions 36 so as to form smoothly curved surface portions. For example, the thickness of the beads 33 formed on the intermediate plate 10 is set to around 60 μm in the regions 34, 35, and around 30 μm in the regions 36. The height of these beads 33 is set higher in the regions far away from the positions in which bolts for fixing the cylinder head to the cylinder block are tightened, so that the beads 33 have the function of equalizing the surface pressure of the beads on the bead plates. When occasion demands, the beads 33 may be formed to a large height in the regions 34 between the holes, and to a small height in the regions other than the mentioned regions.

A seventh embodiment of the metal gasket according to the present invention will now be described with reference to FIGS. 16–22.

The seventh embodiment is different from the third embodiment in that stoppers 38 on an intermediate plate 10 are formed so as to extend intermittently among the circumferences of holes A. Namely, the intermediate plate 10 is provided with stoppers 38 in arcuate regions 34 between the holes A, and in arcuate regions 35 on straight lines Y which are pendicular to a center line X passing the centers O of the holes A, and which pass the same centers O, such stoppers 38 being not provided in the other regions 36. The height of the stoppers 38 varies in boundary regions between the regions 34, 35 and the regions 36 so as to form smoothly curved surface portions. Accordingly, the stoppers 38 on the intermediate plate 10 are formed in positions farthest away from the positions of the clamping bolts for fixing the cylinder head and cylinder block to each other, and the stoppers can therefore fulfil the function of maintaining a predetermined level of surface pressure of the beads in the regions in which the clamping stress of these bolts with respect to the beads on the bead plates becomes small. It is the matter of course that projecting portions of auxiliary beads on the second bead plate are just fitted in recessed portions, which are in a lower surface of the intermediate plate 10, of the stoppers 38.

What is claimed is:

1. A metal gasket comprising
   first and second bead plates formed by elastic metal plates on which main beads are formed along the circumferences of congruent holes, and
   an intermediate plate interposed between said first and second bead plates on which said main beads are arranged in an opposed state, and having a thickness larger than that of said first and second bead plates,
   said intermediate plate being provided in the regions thereof which are on the inner side of main beads with secondary beads extending toward said first bead plate, said secondary beads having a height smaller than that of said main beads,
   said second bead plate being provided with auxiliary beads having projecting portions engageable with recessed portions of said secondary beads on said intermediate plate.

2. The metal gasket according to claim 1, wherein the thickness of said intermediate plate is not less than two times as large as that of said first and second bead plates.

3. The metal gasket according to claim 1, wherein said secondary beads on said intermediate plate constitute compensating portions for preventing a full compression of said main beads on said first bead plate.

4. The metal gasket according to claim 1, wherein said secondary beads formed in the regions of said intermediate plate which are opposed to the outer sides of said main beads on said first bead plate meet in regions between said holes to form common beads.

5. The metal gasket according to claim 1, wherein said secondary beads on said intermediate plate have the sealing function with respect to said main beads on said first bead plate, and the function of stoppers for preventing a full compression of said main beads.

6. A metal gasket according to claim 1, wherein said beads on said intermediate plate are formed so as to have a larger height in regions between said holes, and a smaller height in regions other than said regions.

7. A metal gasket according to claim 1, wherein said beads on said intermediate plate are formed to a larger height in regions between said holes, regions on a center line passing the centers of said holes and regions on straight lines perpendicular to said center line and passing said centers of said holes and formed to a smaller height in regions other than said regions.

8. A metal gasket according to claim 6, wherein the height of said beads on said intermediate plate varies in boundary regions between larger-height regions and smaller-height regions so as to form smoothly curved surface portions.

9. A metal gasket according to claim 1, wherein said beads on said intermediate plate are formed intermittently along the circumferences of said holes.

10. The metal gasket according to claim 1, wherein said intermediate plate is formed out of a metal softer than that of said first and second bead plates.

11. The metal gasket according to claim 1, wherein the first bead plate includes no auxiliary bead.

12. A metal gasket comprising an elastic-metal first bead plate including a first main bead formed along a circumference of a hole, the first main bead comprising a raised portion of the first bead plate extending in a single first direction away from the first bead plate;

an elastic-metal second bead plate including a second main bead formed along the circumference of the hole, the second main bead comprising a first raised portion of the second bead plate extending in a single second direction away from the second bead plate;

an intermediate plate interposed between the first bead plate and the second bead plate, the first bead plate and the second bead plate being oriented with the first direction and the second direction opposed, whereby the first main bead and the second main bead may contact the intermediate plate on opposing sides of the intermediate plate;

a secondary stopper bead comprising a raised portion of the intermediate plate extending in the single second direction to a stopper height, the stopper bead being disposed between the hole and the second main bead;

an auxiliary bead comprising a second raised portion of the secondary bead plate extending in the single second direction away from the second bead plate;

the auxiliary bead being aligned with the stopper bead and having substantially the stopper height;

the stopper bead including a recessed portion having a depth generally equal to the stopper height, whereby a projecting portion of the auxiliary bead is engageable with the recessed portion of the stopper bead of the intermediate plate for sealing therebetween.

13. The metal gasket according to claim 12, wherein the first main bead, the second main bead, the stopper bead, and the auxiliary bead are formed by sheet metal work.

14. The metal gasket according to claim 12, wherein the stopper bead and the auxiliary bead are shorter than a thickness of the intermediate plate.

15. The metal gasket according to claim 12, wherein the stopper bead and the auxiliary bead have substantially equal respective widths.

16. The metal gasket according to claim 12, wherein the stopper height is shorter than a first main height of the first main bead.

17. The metal gasket according to claim 16, wherein a second main height of the second main bead is shorter than the first main height of the first main bead.

18. The metal gasket according to claim 12, wherein the intermediate plate is thicker than the first bead plate and the second bead plate.

* * * * *